Aug. 10, 1965  W. T. OTT  3,200,404
MULTI-RECORD GRAPHIC RECORDER
Filed Nov. 23, 1962
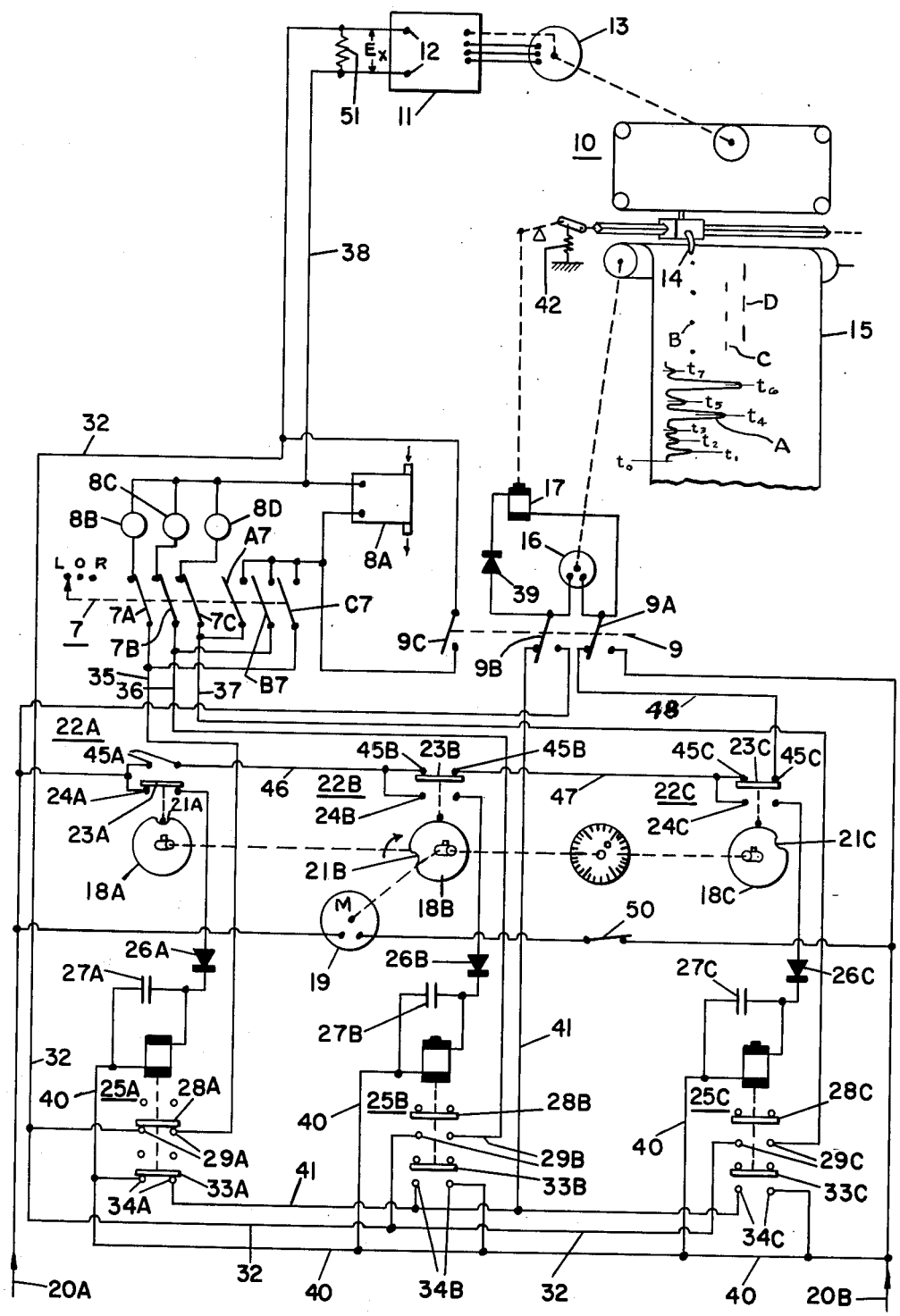

United States Patent Office 3,200,404
Patented Aug. 10, 1965

3,200,404
MULTI-RECORD GRAPHIC RECORDER
Walter T. Ott, Roslyn, Pa., assignor to Leeds and Northrup Company, Philadelphia, Pa., a corporation of Pennsylvania
Filed Nov. 23, 1962, Ser. No. 239,452
5 Claims. (Cl. 346—62)

This invention relates to recorder systems and particularly to multi-record recorders for producing record traces having characteristics identifying the different variables under measurement.

In accordance with the present invention, the means for driving the recorder chart and the marking means for the chart are intermittently energized under control of a programmer including two or more program switches and associated relays having different delay characteristics to provide a number of discontinuous or broken-line record traces corresponding with the different variables under measurement and identifying such variables by characteristic difference in length of the discrete line segments forming the respective traces.

More particularly, the program switches as sequentially operated in a program cycle each cooperate with an associated relay first to apply to the recorder a signal representative of the value of a variable under measurement, and shortly thereafter, to effect energization of the chart drive motor and of the marker means for a brief period corresponding with the release time of the relay. Specifically, characteristic different release times for the different relays of the programmer are provided by connection of different values of capacitance in shunt to the respective relays. Although especially suited for association with the measuring cell of a chromatograph, or the like, to record, by a single marking element, the peak values of two or more selected components of fluid samples supplied to the chromatograph column, the recorder system may be used as a multi-channel recorder whose broken-line traces of characteristically different segment length identify the various signal sources of the recorder.

The invention further resides in a recorder system having new and useful features of combination and arrangement hereinafter described and claimed.

For a more detailed understanding of the invention, reference may be had to the following description of a preferred embodiment thereof which is schematically illustrated in the figure of the attached sheet of drawing.

The recorder arrangement 10 shown in the figure includes a measuring network exemplified by block 11 to whose input terminals 12 is applied a signal $E_x$ representative of the magnitude or value of a condition under measurement. The motor 13 effects balance of the network 11 at the existing value of the applied signal and concurrently adjusts the marking element 14 transversely of the recorder chart 15. With switch 9 thrown to the right from the position shown, the chart drive motor 16 and the pen solenoid 17 are continuously energized from the power-line conductors 20A, 20B via movable contacts 9A, 9B of switch 9, and the transducer 8A is connected to the input terminals 12 of recorder network 11 via movable contact 9C of switch 9. For such position of switch 9, the stylus 14 or other marking element is in engagement with the chart and the chart is continuously driven to produce a single, unbroken-line trace, exemplified by curve A, showing variations in magnitude of signal $E_x$ as a continuous function of time.

With the movable contacts of switch 9 in the position shown in the figure, the energization of the chart drive motor 16 and of the pen solenoid 17 from the line conductors 20A, 20B is programmed to produce a plurality of broken-line traces exemplified by curves B, C, D, each formed by a series of discrete segments or marks of length different for the different curves. Depending upon the position of switch 7, the curves B, C, D may correspond with the outputs of transducers 8B, 8C, 8D respectively or may correspond with the output of a single transducer 8A at preselected times in a program cycle.

With switch 7 in the multi-channel recording position shown, its movable contacts 7A, 7B, 7C respectively connect one terminal of each of the transducers 8B, 8C, 8D to the conductors 35, 36, 37 of the programming circuit. The other terminal of each of the transducers is connected via conductor 38 to the lower input terminal 12 of the recorder network 11.

In the particular programmer shown, the program switches 22A, 22B, 22C are respectively actuated by cams 18A, 18B, 18C driven at suitably slow speeds, for example, one revolution per each five minutes, by motor 19. The notches 21A, 21B, 21C, or equivalent switch-actuating means of the cams, are angularly displaced with respect to each other to obtain sequential actuation of the program switches in each program cycle.

Each time the cam 18A reaches the position shown in the figure, movable contact 23A of the associated program switch 22A engages its lower fixed contacts 24A to complete an energizing circuit for the associated relay 25A. This circuit may be traced from power-line conductor 20A through contacts 23A, 24A of the program switch 22A, diode 26A and the coil of relay 25A to the other supply line conductor 20B by way of conductor 40. The capacitor 27A in shunt to the coil of relay 25A is charged during energization of the relay coil.

Each time relay 25A is energized, its contact 28A moves to the position shown to engage the stationary contacts 29A for connection of the transducer 8B in the input circuit of the recorder network 11. Starting from the lower input terminal 12 of network 11, this circuit can be traced along conductor 38 to transducer 8B, thence through the contact 7A of switch 7 and contacts 28A, 29A of relay 25A to the conductor 32 which is connected to the upper input terminal 12 of network 11.

Each energization of relay 25A also effects movement of its contact 33A into engagement with stationary contacts 34A. Such contact closure connects one terminal of motor 16 and one terminal of solenoid 17 to one side of the supply circuit: specifically, this connection can be traced from line conductor 20B through conductor 40, contacts 33A, 34A of relay 25A, conductor 41 and movable contact 9B of switch 9. The closure of contacts 33A, 34A, however, does not complete an energization circuit for the chart motor or the pen actuating solenoid so that while the marker 14 is out of engagement with the now stationary chart 15, the motor 13 rebalances the network 11 and moves the marker 14 transversely of the chart to a position displaced from the chart edge to extent corresponding with the existing magnitude of the signal output of transducer 8B.

When in each cycle the cam 18A moves beyond the position shown in the figure, the contact 23A of program switch 22A moves out of engagement with fixed contacts 24A and into engagement with fixed contacts 45A. The separation of contacts 23A, 24A of the program switch 22A interrupts the above-traced energizing circuit of relay 25A but the relay remains temporarily held in by the discharge current of capacitor 27A. Thus, for a brief interval, for example 0.5 second, the movable contacts 28A and 33A of relay 25A remain in engagement with fixed contacts 29A and 34A to maintain the connections above traced including the connection from line-conductor 20B to one side of the chart motor 16 and pen solenoid 17.

The connection of the motor and solenoid to the other line-conductor is completed by the aforesaid engagement of contact 23A with contacts 45A of the program switch 22A so that the chart motor and pen solenoid 17 are energized during the delayed release period of the relay 25A. This connection may be traced from line-conductor 20A, contacts 23A, 45A of program switch 22A, conductor 46, contacts 23B, 45B of program switch 22B, conductor 47, contacts 23C, 45C of program switch 22C, conductor 48 and contact 9A of switch 9.

Upon closure of contacts 23A, 45A of program switch 22A, and during the delayed release period of associated relay 25A, the chart 15 is in motion and is engaged by marker 14 as previously positioned by the balancing motor 13 or equivalent. At the end of the hold-in interval afforded by capacitor 27A, the relay 25A releases its movable contacts 28A, 33A for movement away from engagement with contacts 29A and 34A respectively. In consequence, the output of transducer 8B is no longer applied to recorder network 11; the solenoid 17 is deenergized and the marker 14 lifted from chart 15 by spring 42 or other biasing means; and the chart motion is stopped by deenergization of motor 16. At this time a resistor 51 which is permanently connected across the input leads 32, 38 of the recorder network 11 insures that the marker 14 returns to the chart-zero position and holds it there in the intervals between connections to a measured variable. The resistor 51 prevents the recorder input from ever becoming open circuited. If a recorder is permitted to operate with its input open, the pen is apt to wander aimlessly instead of remaining in its last position.

Thus, in each cycle of the programmer, the output of transducer 8B is recorded as a dot forming one of the discrete marks of which curve B is composed, the displacement of the dot from the edge of the chart corresponding with the then existing value of the transducer output.

In like manner for each program cycle, the program switch 22B and the associated relay 25B cooperate first to connect the second transducer 8C in circuit with the recorder network 11 for positioning of marker 14 while it is clear of the chart and while the chart is at rest; and secondly thereafter to produce a short dash forming one of the discrete segments which define the curve C.

Specifically, when the dwell 21B of cam 18B permits contact 23B of program switch 22B to engage contacts 24B, the coil of relay 25B is connected between the supply line conductors 20A, 20B via contacts 23A, 45A of program switch 22A, contacts 23B, 24B of program switch 22B, diode 26B and conductor 40. The capacitor 27B in shunt to the coil of relay 25B may be of substantially larger capacitance than capacitor 27A for correspondingly increasing the time-release characteristic of relay 25B.

The resulting closure of contacts 28B, 29B of relay 25B connects the second transducer 8C between the input conductors 32, 38 of recorder network 11 and the closure of contacts 33B, 34B of the relay 25B connects one terminal of solenoid 17 and motor 16 to one of the supply line conductors, specifically line 20B.

When cam 18B returns contact 23B to the position shown in the figure, contacts 45B are bridged by contact 23B. At this time contacts 23A, 45A of program switch 24A and contacts 23C, 45C of program switch 22C are both closed so that the line conductor 20A is connected to the other side of the pen solenoid 17 and the chart motor 16. Hence these are operative during the hold in time of relay 25B. The value for capacitor 27B is such that relay 25B will release after an interval of for example 1.0 second thus to record the magnitude of variable 8C as a discrete segment of curve C, the length of the segment distinguishing it from the shorter segments of curve B.

At the end of the release time interval of relay 25B, the separation of contacts 33B, 34B of relay 25B interrupts flow of current to motor 16 and solenoid 17 to stop chart 15 and to lift the marker 14 therefrom. At the same time the separation of contacts 28B, 29B of relay 25B removes transducer 8C from the measuring circuit and resistor 51 is effective to return the pen 14 to zero. Thus, for each cycle of the programming means the existing value of the output of transducer 8C is recorded as one of the short dash segments defining curve C.

The program switch 22C and associated relay 25C similarly cooperate in each successive cycle of the programmer to produce one of the longer dashes forming the curve D and so identifying it as representing the output of the third transducer 8D. The larger segments of curve D may be obtained by simply employing a still larger capacitor as a delay capacitor 27C to afford, for example, a release time of about 1.5 seconds in contrast to the one-second delay of relay 25B and the 0.5-second delay of relay 25A. These time characteristics in a recorder to which the invention has been applied when the chart speed was three inches per minute provide for curve B discrete marks $\frac{1}{64}''$ in length; for curve C discrete marks $\frac{1}{32}''$ in length; and for curve D discrete marks $\frac{3}{64}''$ in length. Such differences in lengths are more than sufficient to distinguish the individual curves and the variables they represent, even when the curves cross one another or are otherwise intermingled on the record chart.

The number of program switches and associated relays of different time-release characteristics may, within reason, be increased or decreased to accommodate the requirements of a particular installation. In any case, the switch and relay combinations of the programmer are sequentially effective in each program cycle to apply to the recorder network in sequence a series of signals representing the unknown magnitudes of preselected variables and to produce on the chart 15 a corresponding number of curve segments each of length identifying a particular one of the variables to which a corresponding one of the transducers 8B et seq. is responsive, and each with a displacement representative of the value or magnitude of that variable.

As will now be explained, the programmer recorder system of figure may also be used with a single channel input, such as the measuring cell of a chromatograph, to produce on chart 15 both a chromatogram as a guide for programing and thereafter a number of broken-line curves, exemplified by curves B, C, D respectively, showing the peak values of preselected constituents of successive samples of a gas, vapor, liquid or other fluid applied to a chromatograph column.

For such purpose, the switch 7 is thrown to the position R in which its contacts A7, B7, C7 are effective to include the measuring cell 8A in the input circuit of recorder network 11 whenever any of the relays 25A, 25B, 25C is energized under control of the associated program switch. For this use of the programmer, the actuating cams 18A, 18B, 18C of the program switches are hereinafter described as being angularly set with each cam rider in the middle of its dwell at the time in a program cycle when each selected constituent of the fluid under analysis reaches its peak value. The proper cam settings may be ascertained from a chromatogram of the particular fluid being monitored.

Actually in practice and as more fully described in copending application Serial No. 150,783 filed Nov. 7, 1961, the cams 18A–18C and other cams are included in a complex programmer. While it is to be understood that the fully-automatic recording of one or more peak values of a chromatographic analyzer involves, as disclosed in said application, many switching circuits and devices operating in properly timed sequences, for simplicity of explanation here, the recording operations are described as taking place directly from the cam-operated switches without reference to other time delay devices normally included but not necessary for an understanding of the present invention.

A chromatogram may be made by a separate instrument or may be made by recorder 10 as now described. Switch 9 is disposed in the right-hand position for continuous energization of motor 16 and pen solenoid 17 and for continuous inclusion of measuring cell 8A in the input circuit of the recorder network; switch 7 should be in its neutral or zero position to exclude the program switches and relays. A continuous curve is then traced on chart 15, as exemplified by curve A, which is a chromatogram containing the information required for setting the program switches to effect recording of the peak value of each of the selected constituents. Specifically, the chart motor 16 may be started at time $t_0$ of curve A corresponding with the time of introduction of a sample into the chromatograph column. At time $t_1$, the first component of the sample eluted by the column and passing through the measuring cell 8A reaches its peak value, i.e., the first peak of curve A. Other components of the sample successively attain their peak values at times $t_2$, $t_3$, $t_4$ and so on. Once the elapsed times for appearance of peak readings have been established for a particular fluid, it is characteristic of chromatographic analysis that the peak values of its components will again appear in the same sequence and at the same times for each introduction of a sample into the chromatographic column. Thus, for monitoring variations in peak values of selected components of a fluid having peak readings at times $t_1$, $t_4$, $t_6$, the cams 18A, 18B, 18C are set with respect to the zero of the program cycle for actuation of program switches 22A, 22B, 22C to switch just before and switch back just after times $t_1$, $t_4$, and $t_6$ in the program cycle as determined by the length of the cam dwell. Then with switch 9 in the position shown and with switch 7 in the R position, the output of the measuring cell 8A of the chromatograph is repeatedly applied to the recorder input circuit for brief intervals respectively embracing times $t_1$, $t_4$, and $t_6$; and with proper difference between the lengths of the intervals to produce on chart 15 a dot segment of curve B at time $t_1$, a short dash segment of curve C at time $t_4$, and a longer dash segment of curve D at time $t_6$.

For simplicity of explanation here, it may be assumed that the operator manually sets the cams 18A et seq. for selection of the desired components of the fluid under analysis and initiates each program cycle by closure of a switch 50 concurrently with introduction of successive samples into the chromatograph column. However, it is to be understood that introduction of successive samples and the initiation of the successive program cycles may be effected automatically by arrangements such as fully disclosed in commonly owned copending applications Serial Nos. 150,783 and 164,582 respectively filed Nov. 7, 1961 and Jan. 5, 1962. It will further be understood that, as disclosed in said applications, the operating cams of the program switches may be returned to zero and then be remotely set from observation of curve A to correspond with the times in the program cycle at which appear the peak values of selected components of the fluid under analysis.

In general it is to be understood the invention is not limited to the arrangements specifically described and illustrated but comprehends equivalent embodiments and modifications within the scope of the appended claims.

What is claimed is:

1. A graphic recorder for producing on a chart broken-line record traces whose respective segement lengths identify different variables under measurement comprising means energizable to drive the chart, marking means including means energizable to produce line-trace segments of different lengths along said chart in direction of its drive and each in position corresponding with the value of a measured variable, and programming means for sequentially applying signals representative of the existing magnitudes of the different variables as inputs to the recorder, said programming means including a plurality of different selectively-operated control means respectively having different delay characteristics and respectively controlling energization of at least one of said energizable means for corresponding different intervals of time so to produce discrete line-trace segments of different lengths respectively identifying the different input variables, and in which the marking means comprises a single stylus with electromagnetic means energizable for time intervals of different lengths under control of said programming means to effect movement of the stylus into marking relation with the chart, said chart-driving means being energized under control of said programming means during said different intervals for tracing by said stylus on the moving chart of line segments of correspondingly different lengths.

2. A graphic recorder for producing on a chart broken-line record traces whose respective segment lengths identify different variables under measurement comprising means energizable to drive the chart, marking means including means energizable to produce line-trace segments of different lengths along said chart in direction of its drive and each in position corresponding with the value of a measured variable, and programming means for sequentially applying signals representative of the existing magnitudes of the different variables as inputs to the recorder, said programming means including a plurality of different selectively-operated control means respectively having different delay characteristics and respectively controlling energization of both said energizable means for corresponding different durations of time so to produce discrete line-trace segments of different lengths respectively identifying the different input variables, and in which the selectively-operated control means comprise relays whose coils are shunted by capacitors of different capacitance values for different delayed-release times respectively determinative of the different durations of successive time intervals for which both of said energizable means are energized in each cycle of the programming means.

3. A graphic recorder for producing on a chart broken-line record traces whose respective segment lengths identify different variables under measurement comprising means energizable to drive the chart, marking means including means energizable to produce line-trace segments of different lengths along said chart in direction of its drive and each in position corresponding with the value of a measured variable, and programming means for sequentially applying signals representative of the existing magnitudes of the different variables as inputs to the recorder, said programming means including a plurality of different selectively-operated control means respectively having different delay characteristics and respectively controlling energization of at least one of said energizable means for corresponding different durations of time so to produce discrete line-trace segments of different lengths respectively identifying the different input variables, and in which the programming means comprises a plurality of program switches each controlling energization of an associated one of a group of relays, each of said relays having a different release time determined by a time-constant network and each of said relays having contacts which control connection of one of said variables as a recorder input and which control connection of at least one of said energizable means to a current source for a period corresponding with the release time of the relay.

4. A graphic recorder for producing on a chart broken-line record traces whose respective segment lengths identify different variables under measurement comprising means energizable to drive the chart, marking means including means energizable to produce line-trace segments of different lengths along said chart in direction of its drive and each in position corresponding with the value of a measured variable, and programming means for sequentially applying signals representative of the existing magnitudes of the different variables as inputs to the recorder, said programming means including a plurality of different selectively-operated control means respectively having different delay characteristics and respectively controlling energization of at least one of said energizable means for corresponding different durations of time so to produce discrete line-trace segments of different lengths respectively identifying the different input variables, and in which the marking means comprises a single stylus movable toward and from the chart under control of said programming means, and in which the programming means includes switches respectively associated with individual actuating means each adjustably set to control energization of an associated relay at a program cycle-time corresponding with attainment of the peak value of a selected component of a chromatograph column sample, switches operated by each associated relay and controlling energization of at least one of said energizable means, and means effecting a different release-time for each associated relay to produce by said single marking means broken-line record traces whose segment-lengths identify different selected components of the column sample.

5. A graphic recorder arrangement comprising means energizable to drive a chart with respect to a single marking means, a marker-actuating means energizable to effect cooperation of said marking means with the chart to trace a line on said chart, sequentially operable program switches having normally-open and normally-closed contacts, line-length control relays having different time-delay release characteristics and having normally-open contacts which remain closed during the delayed release time, energizing circuits for said relays respectively completed by temporary closure of the normally-open contacts of the corresponding program switch, and means for effecting repeated energization of at least one of said energizable means for time-intervals of different durations to produce line segments of different lengths along said chart comprising the normally-closed contacts of said program switches and the contacts of said line-length relays as remaining closed during the different release-times thereof.

References Cited by the Examiner
UNITED STATES PATENTS

| | | | |
|---|---|---|---|
| 2,080,065 | 5/37 | Ross et al. | 346—62 |
| 2,113,748 | 4/38 | Ross et al. | 346—44 |
| 2,776,867 | 1/57 | Boyan | 346—25 |
| 2,899,258 | 8/59 | Spracklen | 346—34 |
| 2,982,123 | 5/61 | Kindred | 73—23.1 |

LEO SMILOW, *Primary Examiner.*